United States Patent [19]
Matsui et al.

[11] Patent Number: 5,564,041
[45] Date of Patent: Oct. 8, 1996

[54] MICROPROCESSOR FOR INSERTING A BUS CYCLE IN AN INSTRUCTION SET TO OUTPUT AN INTERNAL INFORMATION FOR AN EMULATION

[75] Inventors: Shigezumi Matsui; Ikuya Kawasaki; Yoshiyuki Kondo; Kouji Hashimoto, all of Tokyo, Japan

[73] Assignees: Hitachi, Ltd.; Hitachi Microcomputer System Ltd., both of Tokyo, Japan

[21] Appl. No.: 201,488

[22] Filed: Feb. 24, 1994

Related U.S. Application Data

[63] Continuation of Ser. No. 687,714, Apr. 18, 1991, abandoned.

[30] Foreign Application Priority Data

Apr. 20, 1990 [JP] Japan ................ 2-104700
Mar. 14, 1991 [JP] Japan ................ 3-049346

[51] Int. Cl.⁶ .................. G06F 11/30; G06F 9/22
[52] U.S. Cl. .................. 395/500; 395/740; 364/264.1; 364/264.2; 364/264.5; 364/267; 364/232.3; 364/232.8; 364/DIG. 1
[58] Field of Search ................ 395/800, 550, 395/700, 500, 740; 364/DIG. 1, DIG. 2

[56] References Cited

U.S. PATENT DOCUMENTS

| | | | |
|---|---|---|---|
| 4,398,247 | 8/1983 | Bazlen et al. | 395/375 |
| 4,636,945 | 1/1987 | Tanagawa et al. | 395/550 |
| 4,674,089 | 6/1987 | Poret et al. | 371/25 |
| 4,747,045 | 5/1988 | Harigai et al. | 395/375 |
| 4,773,002 | 9/1988 | Iwasaki et al. | 395/375 |
| 4,791,557 | 12/1988 | Angel et al. | 364/200 |
| 4,811,345 | 3/1989 | Johnson | 371/16.1 |
| 4,908,749 | 3/1990 | Marshall et al. | 395/325 |
| 4,924,382 | 5/1990 | Shouda | 395/700 |
| 4,954,942 | 9/1990 | Masuda et al. | 395/500 |
| 5,047,926 | 9/1991 | Kuo et al. | 395/575 |
| 5,140,687 | 8/1992 | Dye et al. | 395/500 |
| 5,165,027 | 11/1992 | Krauskopf | 395/400 |
| 5,226,127 | 7/1993 | Fu | 395/375 |

FOREIGN PATENT DOCUMENTS

| | | |
|---|---|---|
| 61-286936 | 12/1986 | Japan . |
| 62-197831 | 9/1987 | Japan . |
| 2200482 | 8/1988 | United Kingdom . |

*Primary Examiner*—Meng-Ai T. An
*Attorney, Agent, or Firm*—Fay, Sharpe, Beall, Fagan, Minnich & McKee

[57] ABSTRACT

A microprocessor having a buffer or memory capable of holding a plurality of instructions in advance of execution also functions to insert a special bus cycle amongst the instructions for outputting the internal information of the microprocessor to the outside in a predetermined operation mode at the time of each execution. The information inside of the microprocessor, which is to be outputted to the outside in the special bus cycle, is identified by the address of the executed instruction in a memory space, an instruction code or the code for identifying said executed instruction in the instruction group prefetched. In an emulation of the system using the instruction prefetch type microprocessor, as described above, what instruction has been executed can be easily known from the outside to effect an accurate emulation analysis and to facilitate the analysis of trace data thereby to improve debugging efficiency.

6 Claims, 16 Drawing Sheets

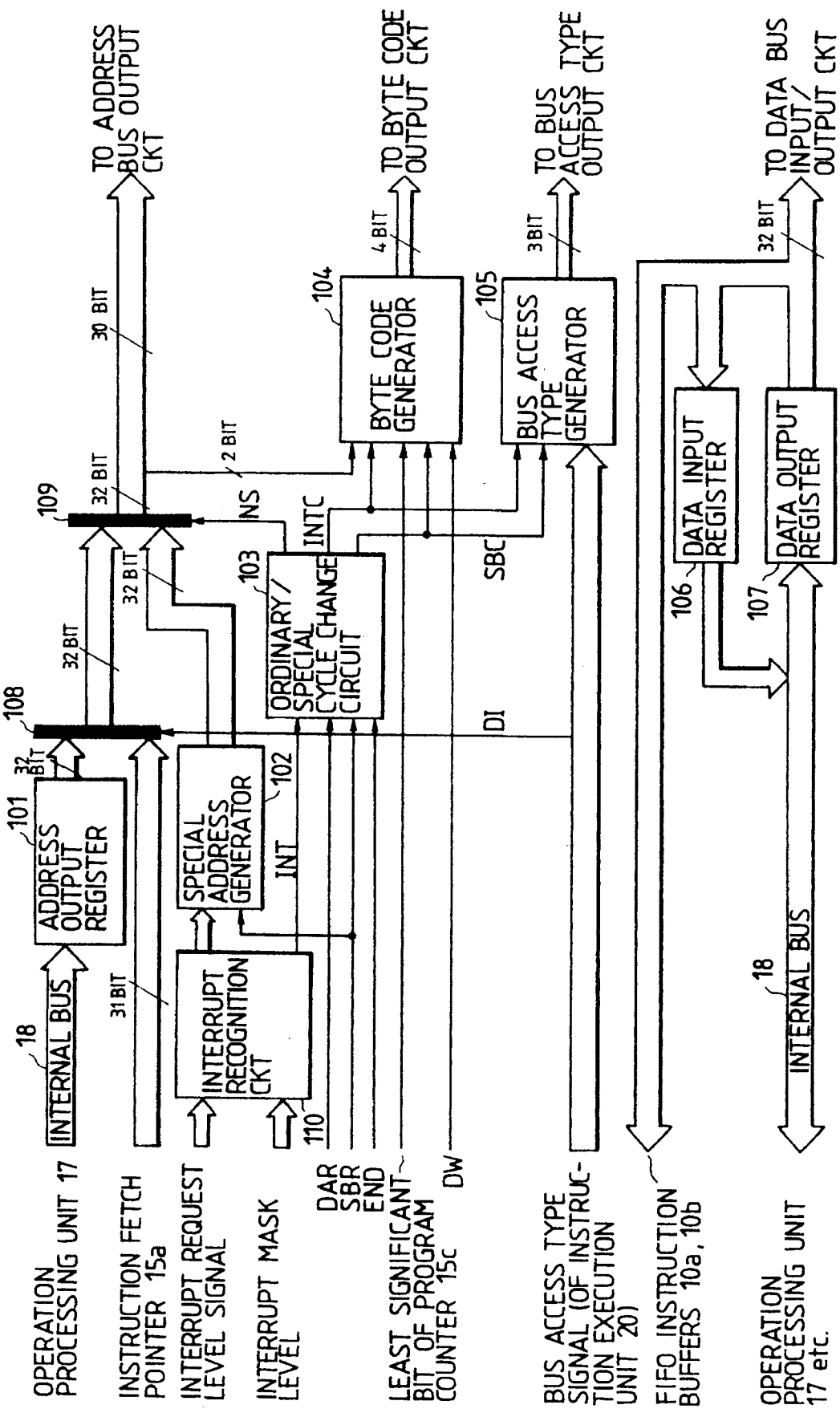

FIG. 10

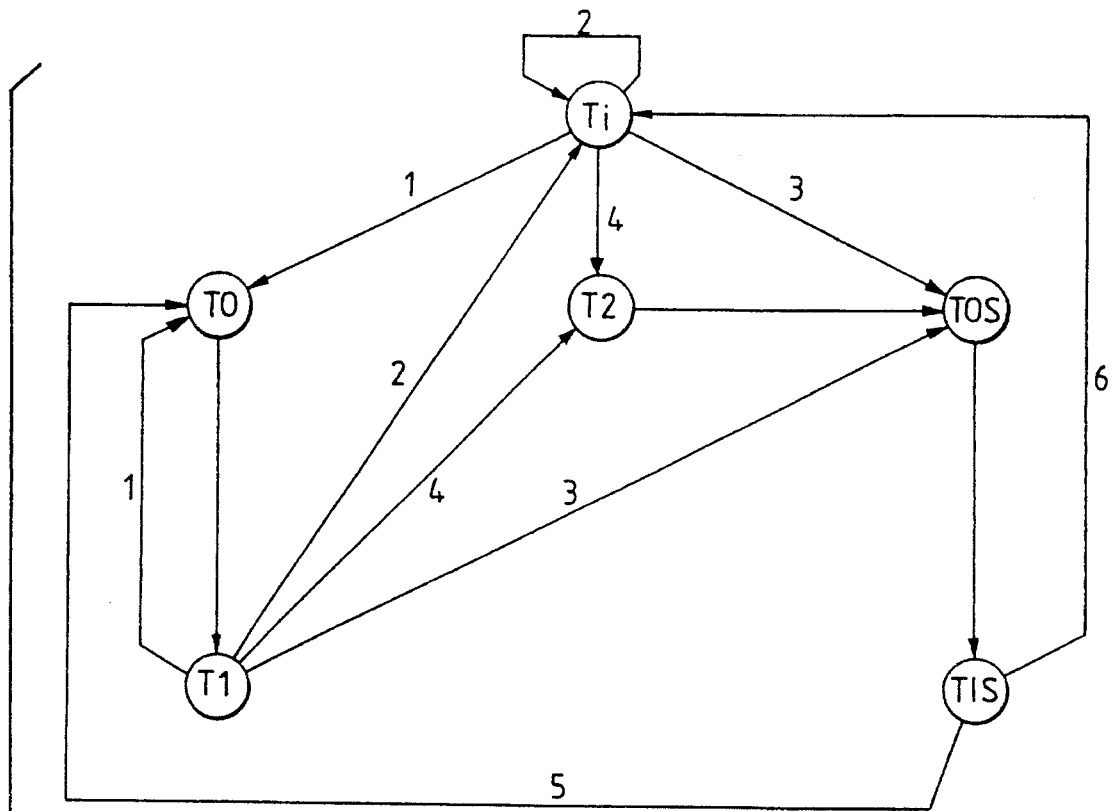

Ti : IDLE STATE
T0 : ORDINARY BUS CYCLE START STATE
T1 : ORDINARY BUS CYCLE END STATE
T2 : INTERRUPT START STATE
TOS : SPECIAL BUS CYCLE START STATE
TIS : SPECIAL BUS CYCLE END STATE

1 : $DAR \cdot (\overline{SBR} \cdot \overline{INT} + \overline{END})$
2 : $\overline{DAR} \cdot (\overline{SBR} \cdot INT + END)$
3 : $SBR \cdot \overline{INT} \cdot END$
4 : $INT \cdot END$
5 : $DAR$
6 : $\overline{DAR}$ DAR : DATA ACCESS REQUEST SIGNAL
SBR : SPECIAL BUS CYCLE REQUEST SIGNAL
END : INSTRUCTION EXECUTION END SIGNAL
INT : INTERRUPT GRANT SIGNAL (a) INSTRUCTION INDICATED BY BUS CYCLE S1

(b) INSTRUCTION INDICATED BY BUS CYCLE S3

(c) INSTRUCTION INDICATED BY BUS CYCLE S6

FIG. 15

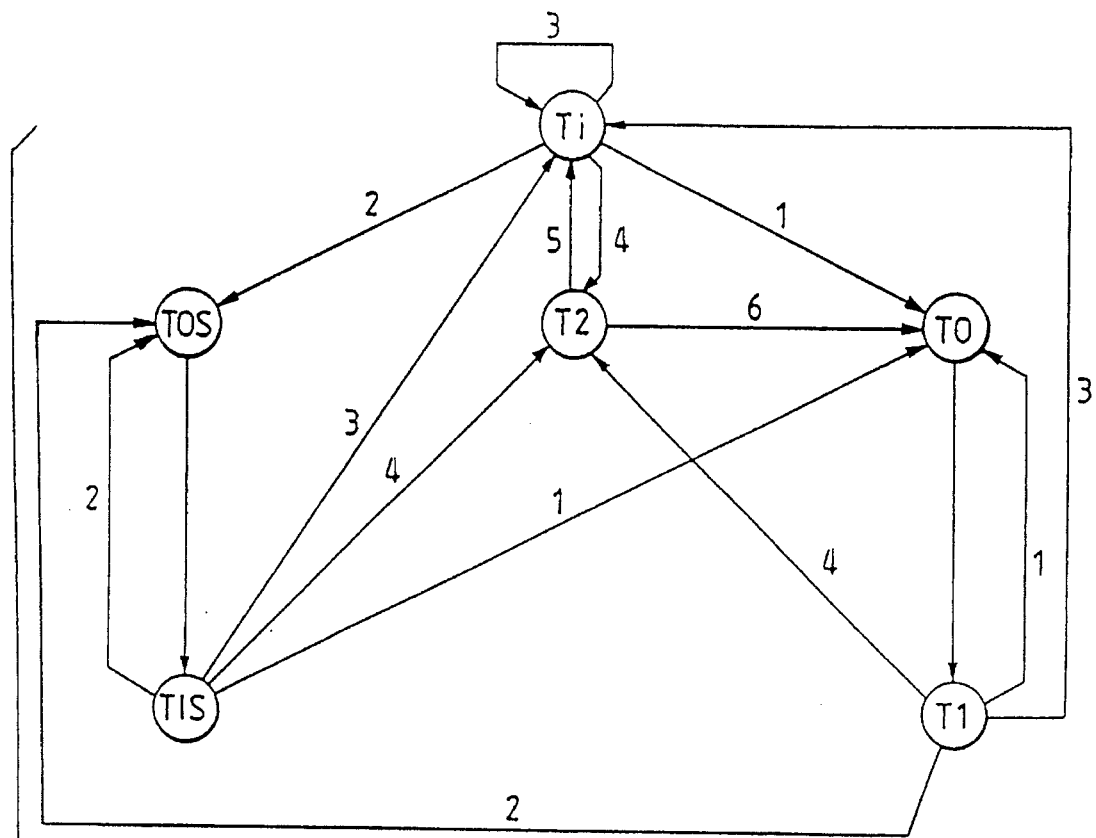

Ti : IDLE STATE
T0 : ORDINARY BUS CYCLE START STATE
T1 : ORDINARY BUS CYCLE END STATE
T2 : INTERRUPT START STATE
TOS: SPECIAL BUS CYCLE START STATE
TIS: SPECIAL BUS CYCLE END STATE

1 : $DAR \cdot \overline{H} \cdot (\overline{SBR \cdot INT} + \overline{END})$
2 : $SBR \cdot END$
3 : $\overline{DAR} \cdot (\overline{SBR \cdot INT} + \overline{END}) + DAR \cdot H$
4 : $INT \cdot \overline{SBR} \cdot END$
5 : $\overline{DAR}$
6 : $DAR$ H  : HIT SIGNAL
DAR: DATA ACCESS REQUEST SIGNAL
SBR: SPECIAL BUS CYCLE REQUEST SIGNAL
END: INSTRUCTION EXECUTION END SIGNAL
INT: INTERRUPT GRANT SIGNAL

FIGURE 16

| AB | DB | BC | R/W | BAT |
|---|---|---|---|---|
| 00027830 | 000A0007 | 0000 | R | PGM |
| 00027834 | 00038811 | 0000 | R | PGM |
| 00027838 | D00C000F | 0000 | R | PGM |
| 00091000 | 00003030 | 1110 | R | DAT |
| 0002783C | 2011D00C | 0000 | R | PGM |
| 0000001C | FFFFFFFF | 0111 | R | I/P |
| 00027838 | D00C000F | 0000 | R | PGM |
| 0002783C | 2011D00C | 0000 | R | PGM |
| 00027840 | 000A8011 | 0000 | R | PGM |
| 00027844 | 02F60000 | 0000 | R | PGM |
| 0000001C | FFFFFFFF | 1101 | R | I/P |
| 0002783C | 2011D00C | 0000 | R | PGM |
| 00027840 | 000A8011 | 0000 | R | PGM |
| 00027844 | 02F60000 | 0000 | R | PGM |
| 0002738C | 2011D00C | 0000 | R | PGM |
| 00027840 | 000A8011 | 0000 | R | PGM |
| 00027844 | 02F60000 | 0000 | R | PGM |
| 00027848 | 0012D00C | 0000 | R | PGM |
| 0002784C | 00370011 | 0000 | R | PGM |
| 0000001C | FFFFFFFF | 0111 | R | I/P |
| 00027844 | 02F60000 | 0000 | R | PGM |
| 00027848 | 0012000C | 0000 | R | PGM |
| 0002784C | 00370011 | 0000 | R | PGM |
| 00027854 | 685CD00C | 0000 | R | PGM |
| 00027858 | 00300011 | 0000 | R | PGM |
| 0002785C | D011880A | 0000 | R | PGM |
| 0000001C | FFFFFFFF | 1101 | R | I/P |
| 00027854 | 685CD00C | 0000 | R | PGM |
| 00027858 | 00300011 | 0000 | R | PGM |
| 0002785C | D011880A | 0000 | R | PGM |
| 00027860 | 00070003 | 0000 | R | PGM |
| 0000001C | FFFFFFFF | 0111 | R | I/P |
| 0002785C | D011880A | 0000 | R | PGM |
| 00027860 | 00070003 | 0000 | R | PGM |
| 00027864 | D011880A | 0000 | R | PGM |
| 00091000 | 30303030 | 1110 | W | DAT |
| 00027868 | 00070002 | 0000 | R | PGM |
| 0000001C | FFFFFFFF | 0111 | R | PGM |

MICROPROCESSOR FOR INSERTING A BUS CYCLE IN AN INSTRUCTION SET TO OUTPUT AN INTERNAL INFORMATION FOR AN EMULATION

This is a continuation of application Ser. No. 07/687,714, filed Apr. 18, 1991, now abandoned.

BACKGROUND OF THE INVENTION

The present invention relates to a microprocessor including circuitry primarily useful for inserting a bus cycle to output an internal information for an emulation. The invention is particularly applicable to an execution instruction informing system for a microprocessor of the instruction prefetch type.

Some of the microcomputers proposed in the prior art have an instruction register of a prefetch type, in which some instructions are prefetched in addition to an instruction to be executed. Execution of a program can be speeded up by fetching a plurality of instructions in advance into the instruction register.

A user who has newly developed a microcomputer system or a software therefor frequently emulates for debugging. In this emulation, the execution of the program is interrupted at an instant when a certain instruction in the program is executed, or data on a bus is traced in the memory at a certain instant. By analyzing the content of the memory thus traced, the causes for a runaway of the program are clarified to facilitate the debugging of the program or system. A data bus or address bus is monitored during the emulation to detect a break point or trace point.

In a microcomputer having an instruction register for prefetching a plurality of instructions, as has been described above, the instruction code or address appearing on the actual bus is different from that of the instruction being executed, in case of the emulation. This makes it impossible to interrupt the execution of the program at a desired instant and makes it difficult to analyze the trace content after the emulation.

One proposal for overcoming this problem is disclosed in Japanese Patent Laid-Open No. 62-197831, in which an instruction being executed by a microcomputer of instruction prefetch type can be accessed from the outside by providing a pin for outputting the difference between the address of the instruction being executed and a prefetched address; or as disclosed in Japanese Patent Laid-Open No. 61-286936 in which an instruction execution occurs by making use of an interrupting function thereby to execute another instruction series for informing the internal state of the microprocessor to the outside.

Of the aforementioned prior art technologies, the system of providing a pin for outputting the difference between the address of the instruction being executed and the prefetched address is defective in that the production cost is raised, in that the period for development is elongated, and in that the system cannot cover the increase in the amount of information required, because the number of pins of the microprocessor has to be increased or because another chip has to be prepared with an additional special pin. On the other hand, the system in which the program is interrupted for each execution of instruction may lose its real time property or may runaway during the emulation.

SUMMARY OF THE INVENTION

A microprocessor having a buffer or memory capable of holding a plurality of instructions in advance also functions to insert a special bus cycle for outputting the internal information of the microprocessor to the outside in a predetermined operation mode at the time of each execution.

The aforementioned special bus cycle inserting function can be realized either by a hardware of an external bus control circuit or an accompanying circuit or by a firmware such as a microprogram control. The information inside of the microprocessor, which is to be outputted to the outside in the aforementioned special bus cycle, comprises the address (which may be a logical address rather than a physical address) of the executed instruction in a memory space, an instruction code or the code for identifying said executed instruction in the instruction group prefetched.

In the emulation of the system using the instruction prefetch type microprocessor, according to the means described above, what instruction has been executed can be easily known from the outside to effect an accurate emulation analysis and to facilitate the analysis of the trace data thereby to improve the debugging efficiency.

Since, moreover, the intrinsically useless special bus cycle is inserted, there cannot be attained a complete real time property. As compared with the existing system for informing the outside of the internal information by executing predetermined instruction series by an interruption function, the real time property is hardly deteriorated because what is inserted is only one cycle.

An object of the present invention is to enable a microprocessor of instruction prefetch type to inform the outside of the internal information such as the address of an instruction being executed, with neither increasing the number of pins nor adding a complicated external circuit.

Another object of the present invention is to provide a microprocessor which is enabled to inform the outside of the internal information without deteriorating the real time property and which is highly flexible for the increase in the amount of information required.

Still another object of the present invention is to provide an in-circuit emulator which can easily interrupt execution of a program at a correct breakpoint or start trace at a desired instant in the emulation of a microcomputer having an instruction register or cache for fetching a plurality of instructions in advance.

A further object of the present invention is to provide a mechanism which can easily recognize from the outside the internal state of a microprocessor necessary for debugging a system or the microprocessor, such as the content of a register for latching an arithmetic or logical operation result.

The aforementioned and other objects and novel features of the present invention will become apparent from the description to be made herein with reference to the accompanying drawings.

BRIEF DESCRIPTION OF THE DRAWINGS

FIG. 9 is a block diagram showing an example of the external bus controller 11 and the special bus cycle generator 19 of the microprocessor as shown in FIG. 1;

FIG. 10 shows an example of a bus state transition diagram of the microprocessor as shown in FIG. 1;

FIG. 15 shows an example of a bus state transition diagram of the microprocessor as shown in FIG. 7; and, FIG. 16 is a table showing a portion of data stored in the trace memory of FIG. 4.

DETAILED DESCRIPTION OF THE PREFERRED EMBODIMENTS

The following showings are for purposes of illustrating preferred embodiments of the invention. It will be appreciated by one of ordinary skill in the art that there are equivalent alternatives to the showings so that the invention is not especially limited to the mere embodiments described herein.

Figure 1:
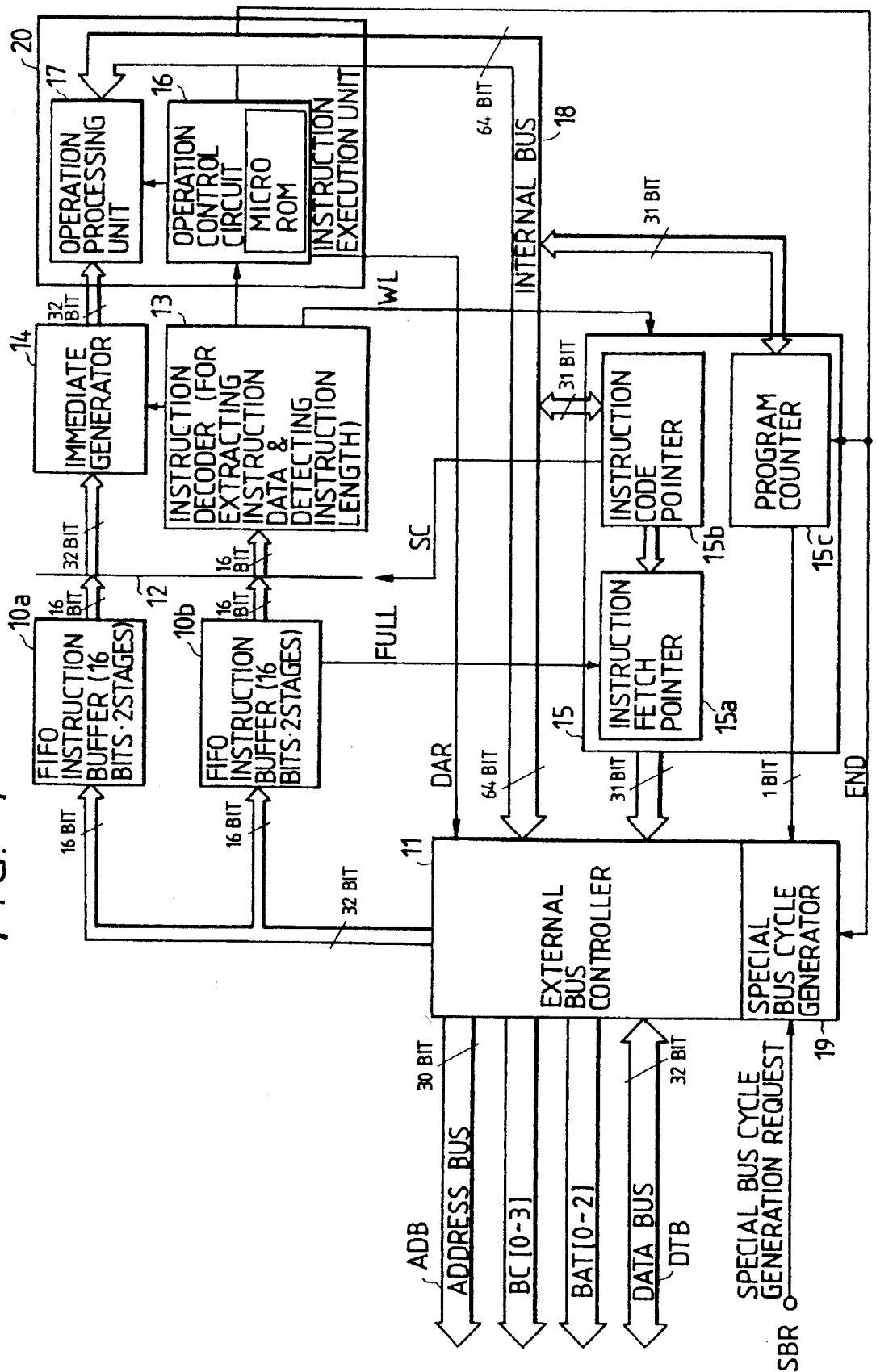
FIG. 1 is a block diagram showing a first embodiment of the microprocessor according to the present invention.

FIG. 1 shows one embodiment in a case where the present invention is applied to an instruction prefetch type microprocessor.

All of the circuit blocks, as shown in FIG. 1, are preferably formed over one semiconductor chip such as a single crystal silicon substrate. The microprocessor of this embodiment has two FIFO type instruction buffers 10a and 10b, each of which can hold two instruction codes of 16 bits each. An external bus controller 11 for controlling the bus cycle is connected to an address bus ADB of 30 bits and a data bus DTB of 32 bits. The external bus controller 11 fetches instruction codes or data having a width of 32 bits at one time from an external memory via the data bus DTB. Moreover, the instruction codes having a width of 32 bits thus fetched at one time in the instruction fetch cycle are divided into two codes of 16 bits, which are respectively stored in the aforementioned two instruction buffers 10a and 10b.

Incidentally, the instruction word of the microprocessor of this embodiment has a variable length of 16 bits×n (n: a positive integer). In this embodiment, the external bus control circuit 11 is enabled to generate and output byte codes BC0 to BC3 of 4 bits each so that it can fetch an instruction at a unit of 16 bits and read/write a data at a unit of byte. These byte codes BC0 to BC3 are usually generated on the basis of either the insignificant 1 bit of an instruction fetch pointer 15a or the insignificant 2bits of the address of 32 bits fed via an internal bus 18 from an operation processing unit 17.

The instruction codes stored in the instruction buffers 10a and 10b can be selectively fed through a selector 12 to an instruction decoder 13 having a width of 16 bits or an immediate generator 14 having a width of 32 bits. The aforementioned selector 12 is switched at a proper timing by a control signal SC coming from an instruction address controller 15 having an instruction code pointer 15b.

The instruction decoder 13 decodes the instruction code fed thereto and detects the instruction length to inform the aforementioned instruction address controller 15 by a signal WL or to start an operation control circuit 16 of a microprogram control type. This operation control circuit 16 generates a control signal for the operation processing unit 17 having an arithmetic device such as an arithmetic and logical unit or a general purpose register group, for executing a processing corresponding to the instruction code held in the instruction decoder 13.

The operation result from the operation processing unit 17 is fed via the internal bus 18 having a width of 64 bits (comprised of two sets each of 32 bits width) to the external bus controller 11 or the instruction address controller 15. On the other hand, the data read from the external memory is fed via the internal bus 18 to the operation processing unit 17. When data or instructions are to be read in from the outside, or when data is to be written to the outside, a data access request signal DAR is fed from the operation control circuit 16 to the external bus controller 11.

In this embodiment, the aforementioned instruction address controller 15 is equipped, in addition to the instruction fetch pointer 15a for holding the instruction fetch address, with the instruction code pointer 15b having a width of 31 bits for instructing which of the instruction codes fetched in the aforementioned instruction buffers 10a and 10b is to be executed, and a program counter 15c for holding the leading address of an instruction to be executed. The least significant 1 bit of the instruction code pointer 15b is fed as the selector control signal SC to the selector 12. The instruction code pointer 15b is automatically incremented by the length of the instruction word on the basis of the signal WL which indicates the length of the word of the execution instruction coming from the instruction decoder 13.

The instruction fetch address having a length of 31 bits held in the instruction fetch pointer 15a is fed to the external bus controller 11, which outputs the more significant 30 bits of them on the external address bus ADB. The instruction fetch pointer 15a is automatically updated till the instruction buffers 10a and 10b are fully occupied.

In the case of a branch instruction, the target address fed from the operation processing unit 17 is set not only in the instruction code pointer 15b but also in the program counter 15c. This program counter 15c has a width of 31 bits. When the data position is indicated by a relative address, for example, the value of the program counter 15c is sent via the internal bus 18 to the operation processing unit 17 so that the value obtained by adding a displacement (or offset) is outputted as the address to the outside. The immediate generator 14 has a width of 32 bits and extracts an immediate value from the instruction word in response to the control signal of the instruction decoder 13 and delivers it to the operation processing unit 17.

In this embodiment, it is a feature of the invention that the aforementioned external bus controller 11 is equipped with a special bus cycle generator 19.

An instruction execution end signal END is fed at each instruction end from the operation control circuit 16 to the special bus cycle generator 19 and the instruction address controller 15. In response to this signal, the program counter 15c is loaded with the value (i.e., the execution instruction address) of the instruction code pointer, and the special bus cycle generator 19 is fed with the least significant bit of the program counter 15c. At this time, the instruction buffers 10a and 10b are cleared.

The special bus cycle generator 19 is validated in response to a mode assignment signal such as a special bus cycle request SBR coming from the outside and provides the external bus controller 11 with a control signal for inserting the special bus cycle in the instruction executions. In response thereto the controller outputs to the outside the leading end position of an instruction (of 16 bits×n (n is an integer))to be executed next. This end portion can be the more or less significant portion of the instruction code having a length of 32 bits that is latched simultaneously therewith.

However, the external bus controller 11 also has a function to decide whether the special bus cycle or another bus cycle (or data cycle) is to be preferred.

The microprocessor of this embodiment indicates to which of the more or less significant side of 32 bits the instruction to be executed next belongs, by outputting the signal corresponding to the least significant bit of the program counter 15c in the byte codes BC0 to BC3 by the special bus cycle. Since the instruction buffers 10a and 10b are cleared in this embodiment at the time of inserting the special bus cycle, the next instruction is re-fetched in the next cycle even if it has been once fetched. This makes it possible to learn the instruction code to be executed, in view of the signal on the data bus in the next cycle to the special bus cycle.

Alternatively, all the bits of the program counter 15c may be outputted in the special bus cycle, in place of outputting the data corresponding to the least significant bit of the program counter 15c at the time of inserting the special bus cycle. In this case, it is sufficient to use the address ADB and the byte codes BC0 to BC3 together. Then, the next executed instruction can be known from the outside even if the instruction buffers 10a and 10b are not cleared.

In the microprocessor of this embodiment, moreover, when this special bus cycle is executed, it is indicated by bus access type signals BAT0 to BAT2 of 3 bits that the bus cycle is a special one. Those bus access type signals BAT0 to BAT2 are used to identify not only the special bus cycle but also an instruction fetch cycle, a data write cycle, a data read cycle or a command sending cycle for a coprocessor.

Incidentally, it has been described in the foregoing embodiment that the special bus cycle generator 19 accompanies the external bus controller 11. However, the special bus cycle generator 19 need not be packaged in the external bus controller 11 nor integrated with the external bus controller 11.

In the microprocessor of this embodiment, a demander is responded to by using the special bus cycle when an interruption is demanded. At this time, codes (having the least significant 3 bits of 000, 001, 010, 011, 100, 101 and 110) indicating the interruption levels 0 to 6 are caused to appear on the address bus ADB. In this embodiment, therefore, the least significant 3 bits 111 on the address bus ADB are assigned thereon with the code (having an address of 0000001C in the hexadecimal notation) so that the special bus cycle indicating the more/less significance of the instruction to be executed next may be identified from the special bus cycle for the interruption response.

In the foregoing embodiment, moreover, the special bus cycle indicating the more/less significance is inserted just before the instruction execution. Alternatively, the special bus cycle can be inserted after the instruction execution cycle to inform the outside, in the next bus cycle, of which of the more or less significance the executed instruction has, by sending the least significant bit of the preceding instruction address to the special bus cycle generator 19 and latching it in the generator 19 simultaneously with the loading of the instruction address from the instruction code pointer 15b to the program counter 15c in the microprocessor of the embodiment of FIG. 1.

FIG. 9 shows one example of the external bus controller 11 and the special bus cycle generator 19 of the microprocessor of FIG. 1.

In FIG. 9, reference numeral 101 designates an address output register; numeral 102, a special address generator; numeral 103, an ordinary/special cycle change circuit; numeral 104, a byte code generator; numeral 105, a bus access type generator; numeral 106, a data input register; numeral 107, a data output register; numerals 108 and 109, selectors; and, numeral 110, an interrupt recognition circuit. The output CKTs shown in FIG. 9 are included in the bus controller 11 in FIG. 1, but not shown therein.

The address output register 101 latches an address of 32 bits for accessing the data of an external memory, which is fed from the operation processing unit 17 via the internal bus 18. The selector 108 selects either the output of the address output register 101 or the output of the instruction fetch pointer 15a latching the instruction fetch address, in response to a data instruction signal DI indicating whether the data or the instruction of the bus access type signal outputted from the instruction execution unit 20 is to be accessed. Since the output of the instruction fetch pointer 15a has a length of 31 bits in this embodiment, the selector 108 has a function to set the least significant bit of its output to "0" to give a length of 32 bits in case it selects the output of the instruction fetch pointer 15a.

The special address generator 102 generates a special address to be outputted in a special bus cycle to the address bus ADB in response to the interrupt request level of the output of the interrupt recognition circuit 110 and the special bus cycle request signal SBR. The interrupt recognition circuit 110 is one for deciding whether or not an interrupt is to be accepted, by comparing the interrupt request level signal coming from the outside and the interrupt mask level in the microprocessor. In case the interrupt is accepted, the interrupt recognition circuit 110 feeds the accepted level to the special address generator 102 and activates the interrupt allowance signal INT indicating the accepting of the interrupt.

In response to the interrupt grant signal INT, the data access request signal DAR, the special bus cycle generation request signal SBR and the instruction execution end signal END, the ordinary/special cycle change circuit 103 generates a signal NS for the selector 109 to select one of the outputs of the selector 108 and the special address generator 102, a signal INTC indicating the interrupt cycle, and a signal SBC indicating the special bus cycle.

The byte code generator 104 feeds the byte code output circuit with byte code data necessary for the individual cycles, in response to the less significant 2 bits of the address of 32 bits, a signal DW indicating the width of the access data outputted from the instruction execution unit 20, the signal INTC indicating the interrupt cycle, the signal SBC indicating the special bus cycle, and the least, significant bit of the program counter 15c. In the special bus cycle, according to this embodiment, in response to the least significant bit of the program counter 15c, the byte code generator 104 outputs a byte code for outputting to the outside which of the more or less significant sides of the instruction code of a length of 32 bits fetched simultaneously, belongs to the head of the instruction to be next executed.

The bus access type generator 105 feeds the bus access type data to the bus access type output circuit in response to the signal INTC indicating the interrupt cycle, the signal SBC indicating the special bus cycle, and the bus access type signal outputted from the instruction execution unit 20. In the interrupt cycle and the special bus cycle, according to this embodiment, the bus access type signals BAT0 to BAT2 outputted are "010".

The data input register 106 and the data output register 107 are interfaces between the internal bus 18 and the data input/output circuit. They latch input and output data temporarily.

The address output register 101 is shown to be interposed between the internal bus 18 and the selector 108 but may be interposed either between the selector 108 and the selector 109 or between the selector 109 and the address bus output circuit.

FIG. 10 shows one example of the state transition of a bus cycle to be controlled by the external bus control circuit 11 and the special bus cycle generator 19 of the microprocessor of FIG. 1.

The bus cycle comes into a state Ti in response to a signal RESET (not shown in FIG. 1) for initializing the microprocessor. The bus cycle is in an idle state in the state Ti and is selectively transitioned to an ordinary bus cycle (i.e., states T0 and T1), a special bus cycle (i.e., states T0S and T1S) and an interrupt start state T2. The transitions from the state T0 to the state T1, from the state T0S to the state T1S, and from the state T2 to the state T0S are unconditional.

In this embodiment, the interrupt cycle is one of the special bus cycle (i.e., the states T0S and T1S), although not necessarily limited thereto. In the special bus cycle (i.e., the states T0S and T1S), moreover, the instruction execution end signal END is not generated. Still moreover, the interrupt grant signal INT is preferred in case the interrupt grant signal INT and the special bus cycle request signal SBR are simultaneously generated. In this embodiment, furthermore, the ordinary bus cycle and the special bus cycle are automatically ended with no external condition, but may be ended in response to an acknowledge signal or the like coming from the external memory. In this case, the state T1 or T1S is continued until the acknowledge signal is inputted.

Figure 2:
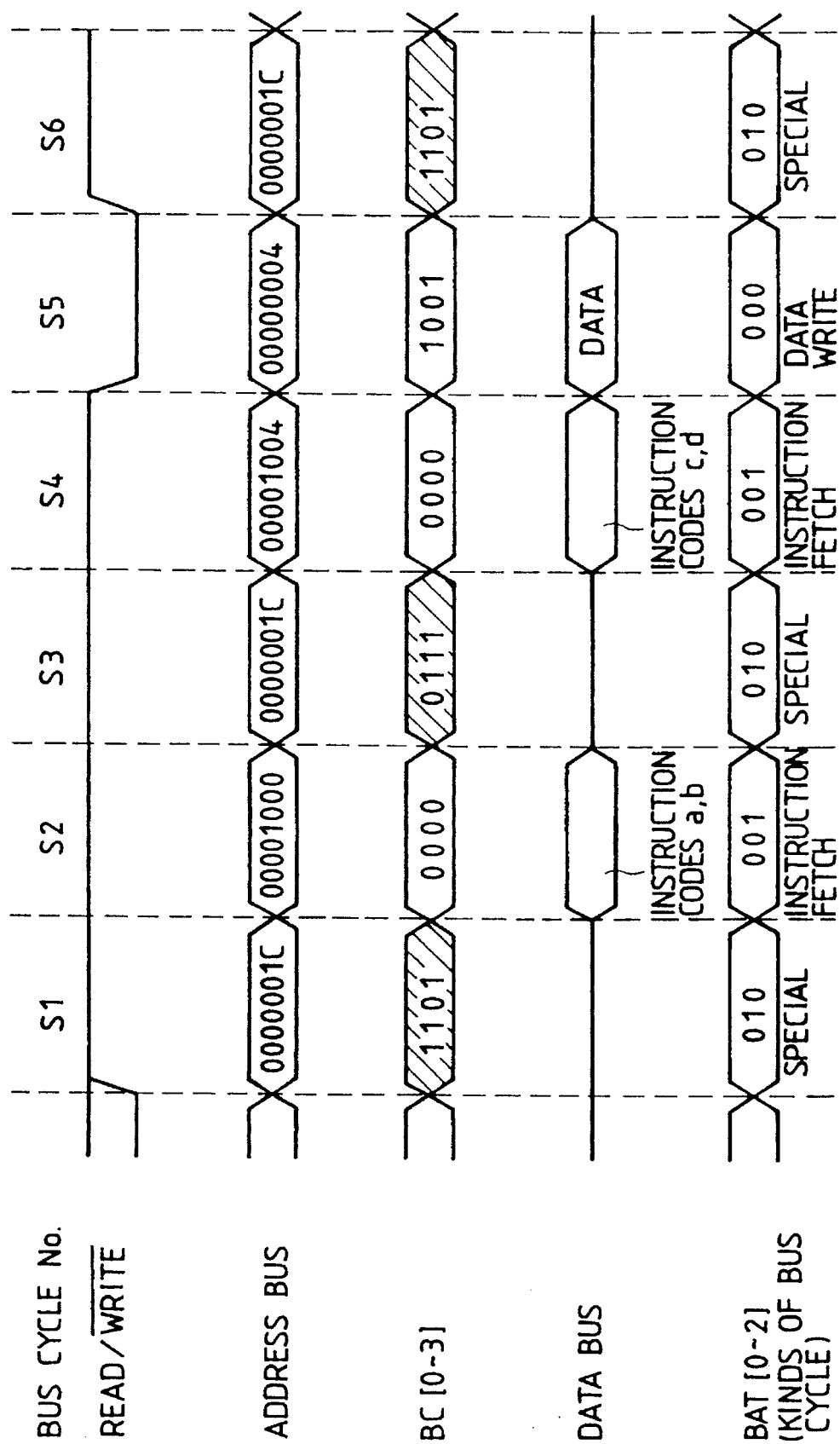
FIG. 2 is a timing chart showing the operations in the special bus cycle insertion mode of the microprocessor as showing in FIG. 1.

FIG. 2 shows the operation timings of the individual buses in case the following program is executed, for example, in the system using the aforementioned microprocessor:

|          |         |              |   |
|----------|---------|--------------|---|
| 00000100 |         | BEQ LABEL1   |   |
| —        |         |              |   |
| —        |         |              |   |
| 00001000 |         | MOVE #4, R0.w | a |
| 00001002 | LABEL1 : | ADD #1, R0.w | b |
| 00001004 |         | MOV R1.w, @R0.h | c |
| 00001006 |         | MOV R1.w, R2.w | d |

The instruction BEQ at an address of 100 in the aforementioned program is a branch on, and the operation timing for jumping to the LABEL1 (at an address of 1002) is jumped by the execution of the branch instruction.

With reference to FIG. 2, in a bus cycle S1 immediately before a bus cycle S2 for fetching instructions a and b, the bus access type signals BAT0 to BAT2 are outputted as "010" to indicate that the bus cycle is the special one. In this bus cycle S1, moreover, the byte position of the leading end of the instruction to be executed of the instruction codes of 32 bits to be fetched next is clarified by the byte codes BC0 to BC3 (1101). In FIG. 2, the leading position of the instruction to be executed is indicated at "0" of the BC0 to BC3. In the next bus cycle S2, moreover, the instruction codes a and b are fetched (and are simultaneously executed because the instruction register is cleared) through the data bus. It is therefore found that the instruction to be executed in the bus cycle S2 is b (ADD #1, R0.w).

In the operation timing of FIG. 2, the special bus cycle is inserted again in a bus cycle S3 next to the bus cycle S2 to inform the outside of which of the more/less significance of the fetched instruction word (of 32 bits) an instruction to be executed in the next bus cycle S4 belongs to. Since, in FIG. 2, the bytes BC0 to BC3 are at 0111 in the special bus cycle S3, it is found to be the instruction c (MOV R1.w, @R0.h) of the instructions c and d fetched that is executed in the next bus cycle S4. Since that instruction c is a data transfer one, the instruction execution end signal END is issued after the data write cycle has been executed in a bus cycle S5. Thus, it is found from FIG. 2 that the special bus cycle is inserted in a next bus cycle S6.

Figure 11:
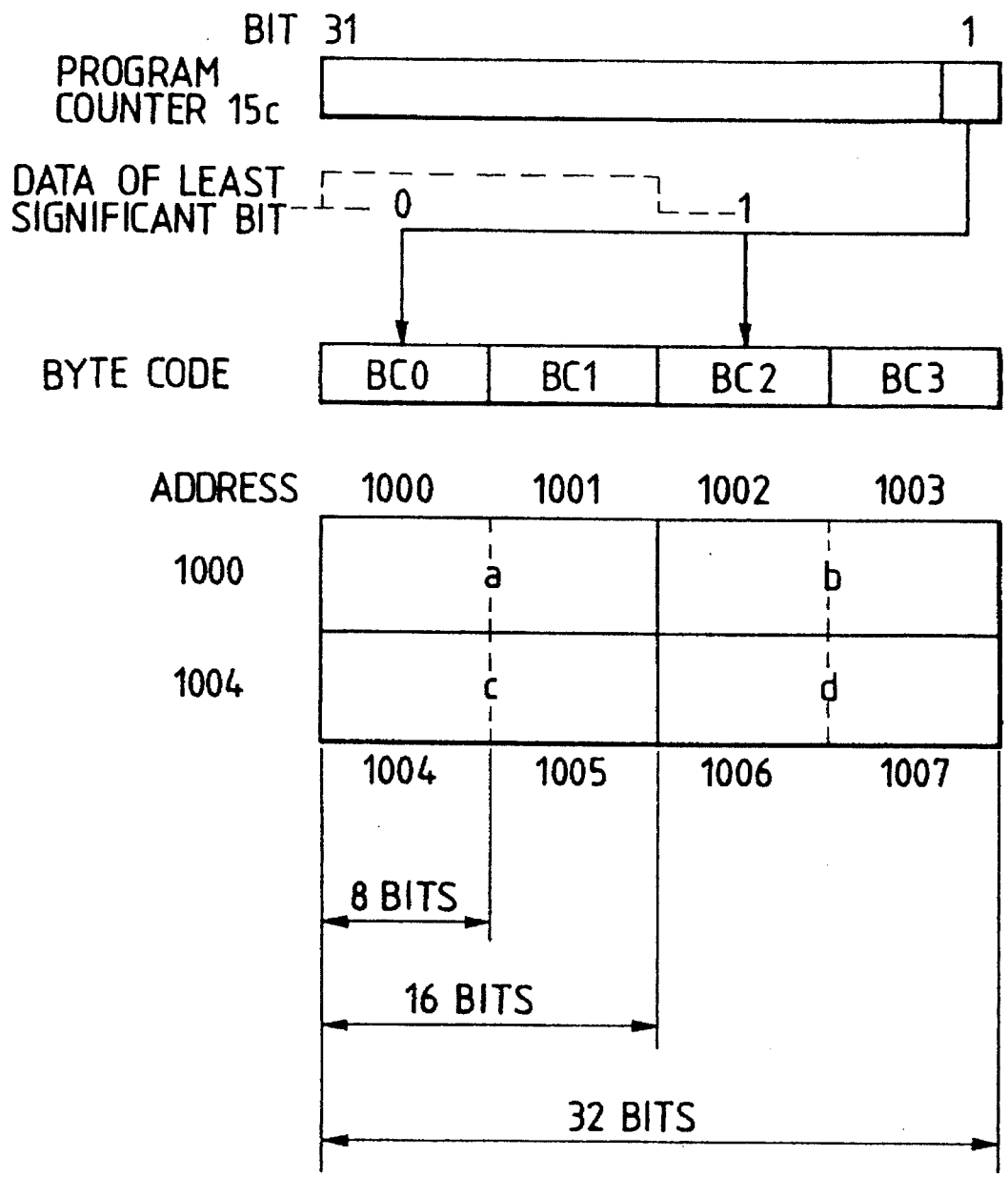
FIG. 11 shows the arrangement of the memory with the instructions a to d of the program.

FIG. 11 shows the relations among the data of the least significant bit of the program counter 15c and the byte codes BC0 to BC3, the correspondences between the addresses of the memory and the byte codes BC0 to BC3, and the arrangements of the aforementioned program instructions a to d over the memory.

In this embodiment, the instruction is a positive integer as long as 16 bits, and the head of an instruction is always located at an even address. Thus, the byte codes at the time of the special bus cycle are "0" only at BC0 and BC2. Incidentally, the byte codes BC0 to BC3 at the time of the instruction fetch cycle are "0000".

Figure 12A:
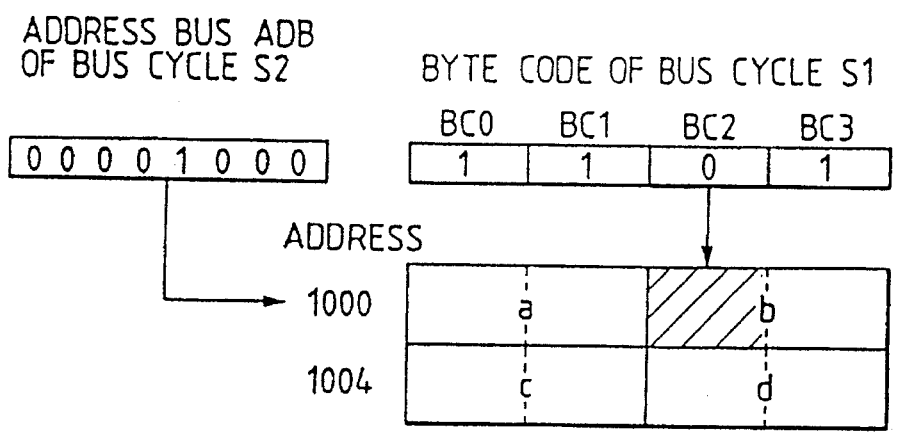
FIG. 12 shows the positions over the memory of the execution instructions, as indicated by the special bus cycle.
Figure 12B:
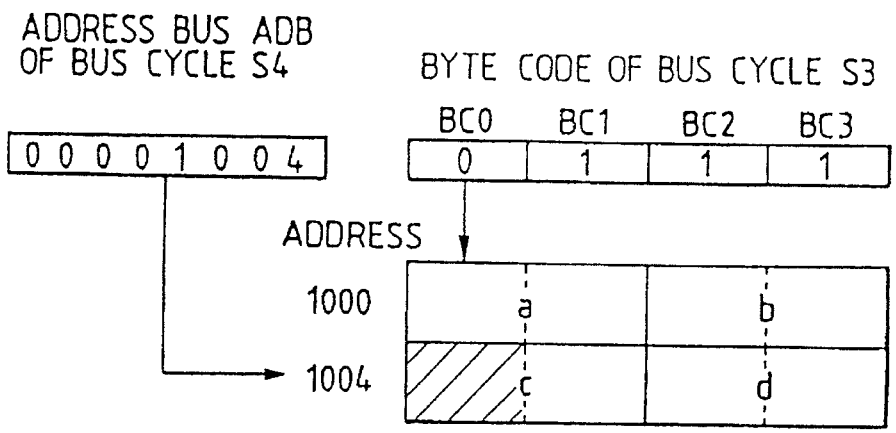
Figure 12C:
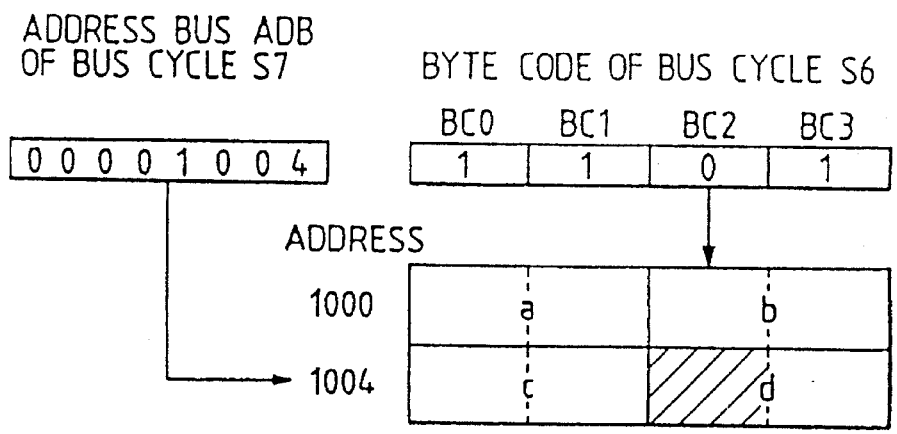

FIG. 12 shows the byte codes BC0 to BC3 of the special bus cycles (i.e., the bus cycles S1, S3 and S6) of FIG. 2. The head position, on the memory of the instruction to be executed by a bus cycle next to the special bus cycle indicated by the address on the address bus ADB outputted in bus cycles (i.e., S2, S4 and S7) next to the special bus cycle, is latched. Thus, the execution instructions of the microprocessor of FIG. 1 can be known from the outside by monitoring the byte codes BC0 to BC3 of the special bus cycles, the address bus ADB and the data bus DTB of bus cycles next to the special bus cycles, and so on. FIG. 2 shows only the case in which an instruction of one word, having a length of 16 bits, is executed. In case of the execution of an instruction of two words or more, two or more instruction cycles are continued, as in the aforementioned bus cycles S4 and S5.

Incidentally, the microprocessor of the aforementioned embodiment is of the type, in which all the instructions are fetched from the outside. However, the instructions may be fetched from the inside of the microprocessor by packaging a cache memory in the inside. Since, however, the instruction to be fetched into the instruction buffer cannot be accessed in this case from the outside, the operation of the cache memory has to be interrupted in the special bus cycle insertion mode so that the instruction may be fetched from the outside. Therefore, the special bus cycle request signal SBR fed from the outside may act as a request signal for interrupting the operation of the cache memory.

Figure 3:
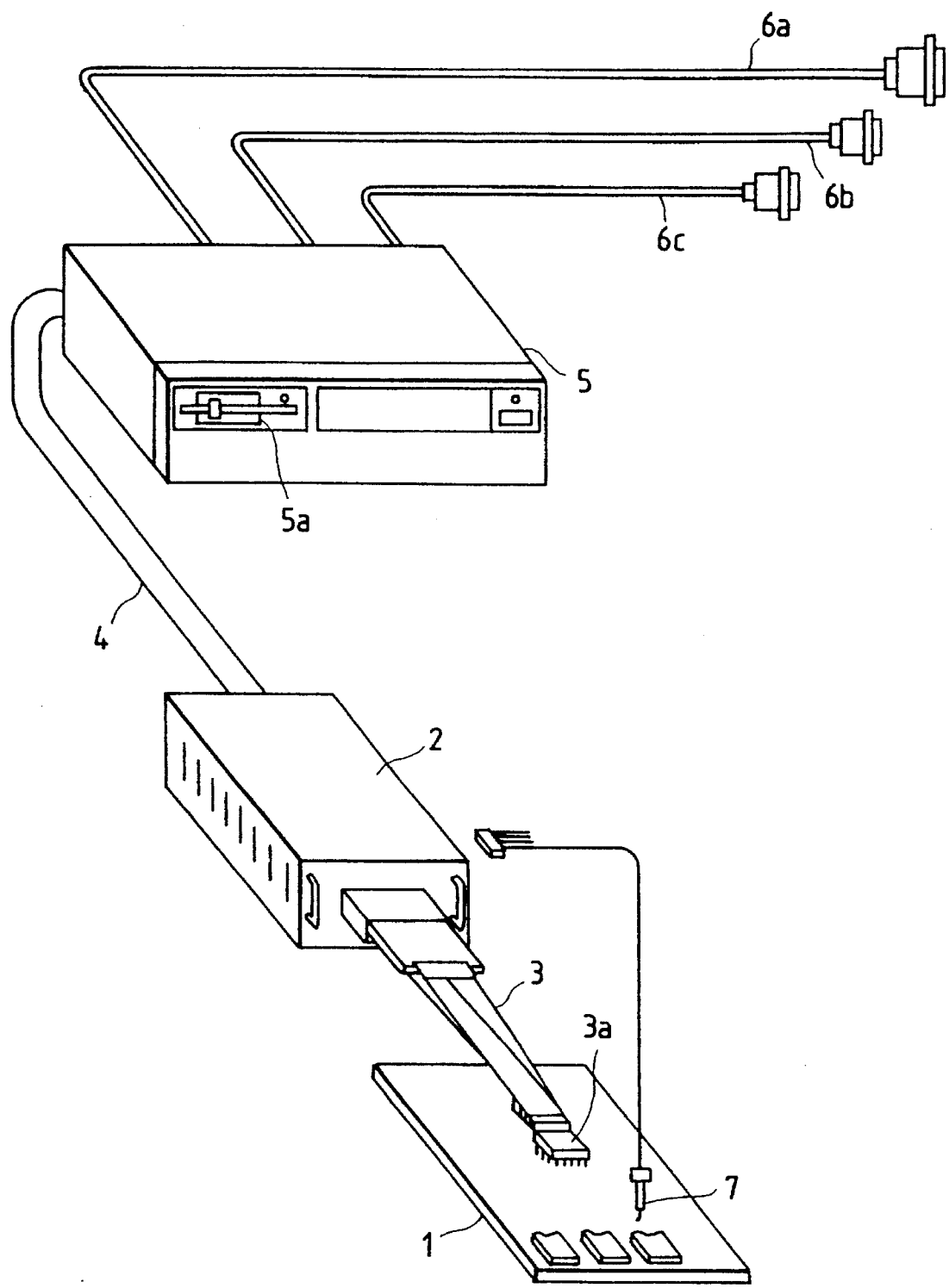
FIG. 3 is a perspective view showing an example of the structure of the in-circuit emulator.

FIG. 3 shows an example of the system structure of an in-circuit emulator for the emulation of a microcomputer system (or user system) using the microprocessor of the aforementioned embodiment.

Figure 13:
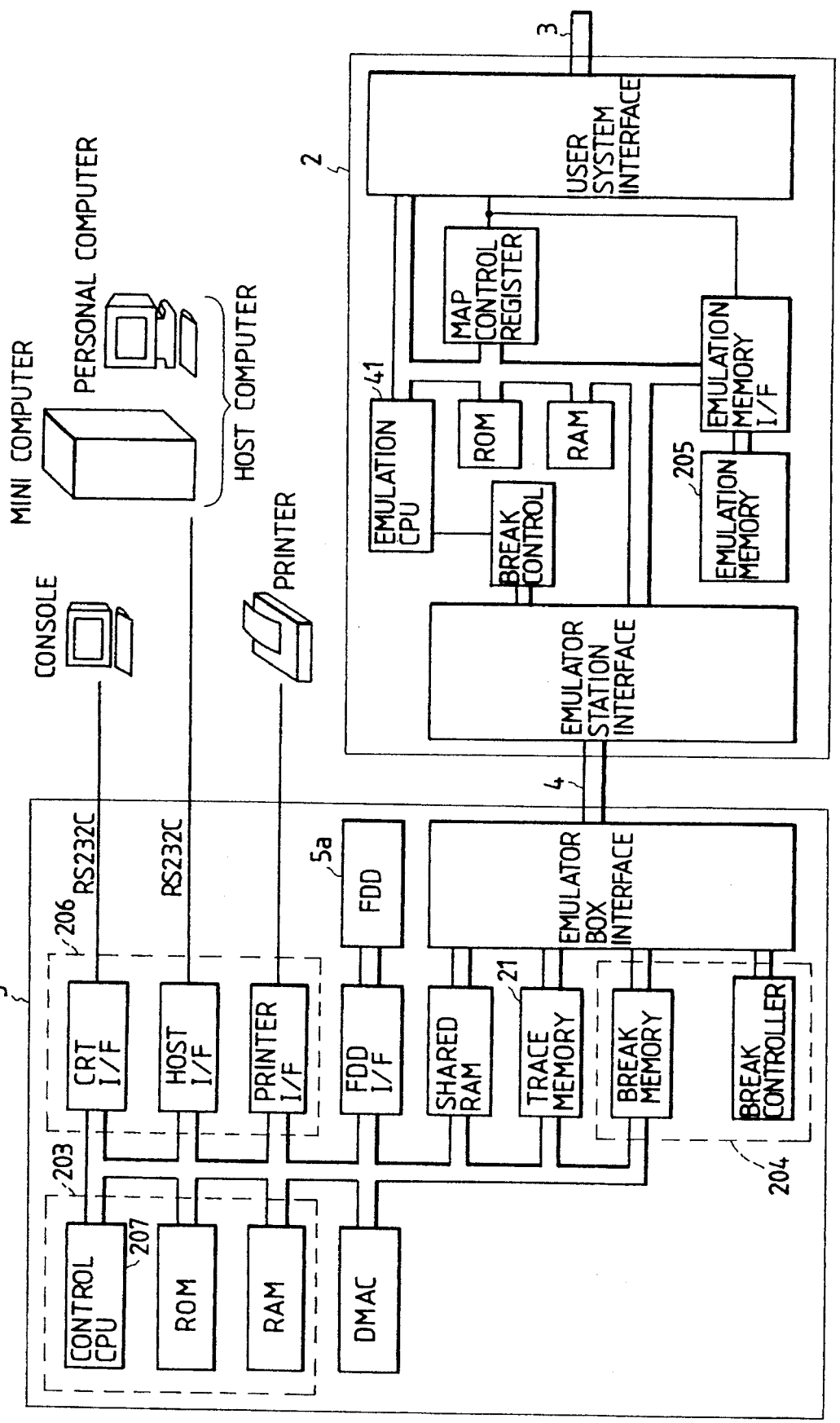
FIG. 13 is a block diagram showing an example of the in-circuit emulator.

In FIG. 3, reference numeral 1 designates a microcomputer system board acting as a user system which had been developed by a user and is to be debugged. Numeral 2 designates an emulator box which packages, as shown in FIG. 13, an emulation microprocessor 41 that emulates the functions of the microprocessor on the aforementioned user system 1; a trace memory 21 for sampling and storing a signal on the bus of the user system during the emulation; an emulation control unit 203 for realizing the emulation of various debugging functions; a breakpoint control unit 204 for setting the conditions for starting the execution of the program or stopping the trace to interrupt the program or trace when the conditions hold; and an emulation memory 205 to be lent in case no memory is prepared in the user system. A cable 3 extending from the body of the emulator box 2 has its leading end connector 3a inserted into the socket for a target processor of the user system 1 and connected with the user system. At the same time, the emulator box 2 is connected through another cable 4 extended from the body thereof with an emulator station 5 packaging a serial interface 206 for the data communications with the host computer, a microcomputer (a control CPU) 207 (FIG. 1) for controlling the interface, a floppy disc driver (FDD) 5a, and so on. The host computer can be exemplified by a minicomputer, an engineering work station or a personal computer.

From the aforementioned emulator station body 5, there are extended a printer connecting cable 6a, a host computer connecting cable 6b, and a CRT display connecting cable 6c. Numeral 7 designates a probe for sampling an arbitrary signal from the user system 1.

Figure 4:
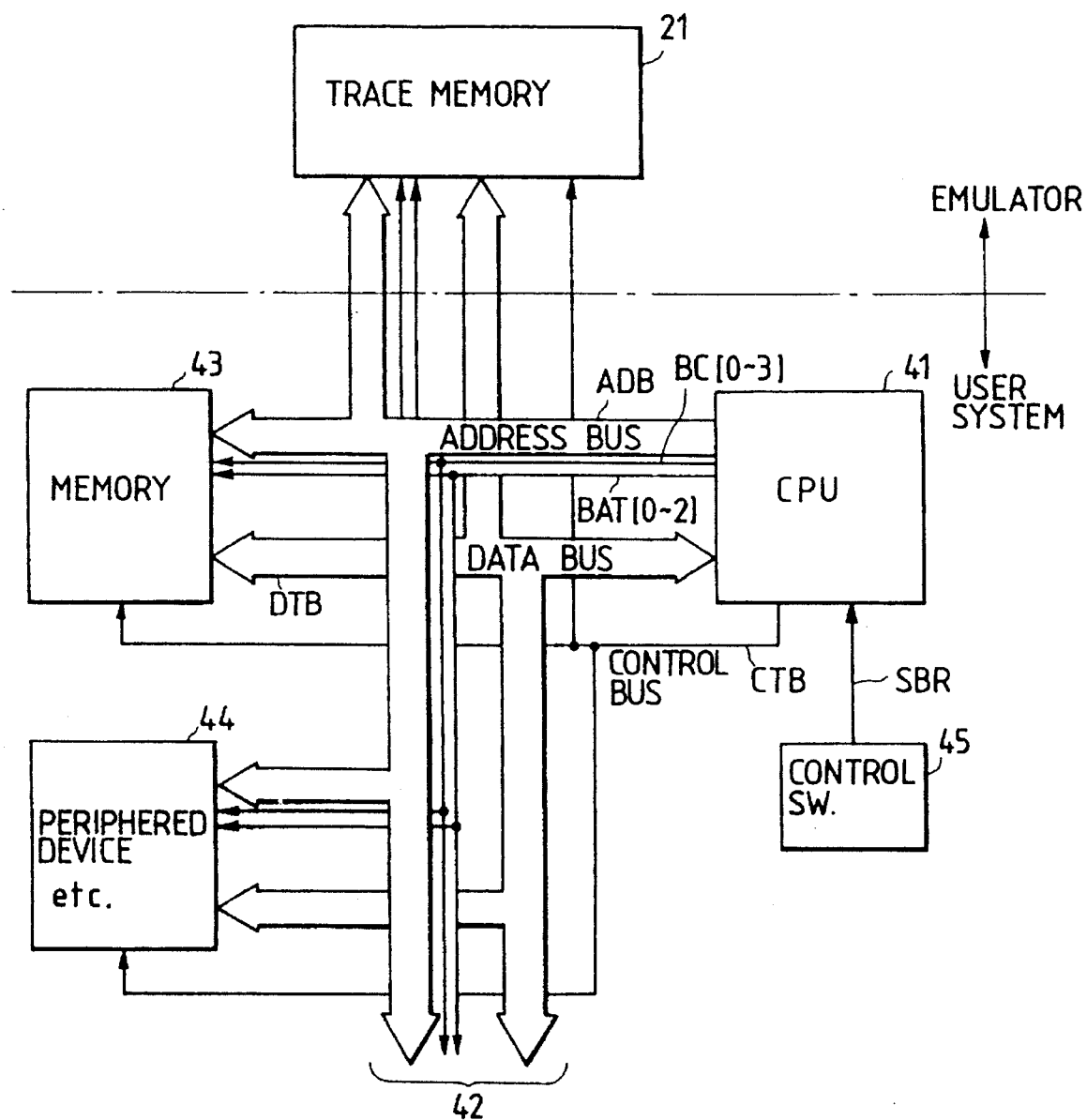
FIG. 4 is a block diagram showing a portion of the microprocessor system using the microprocessor according to the present invention and the emulation system.

FIG. 4 representatively shows one example of the structure of the aforementioned user system 1 and only the trace memory 21 of the emulator connected with it.

In FIG. 4, reference numeral 41 designates a microprocessor according to the present invention, as shown in FIG. 1. This microprocessor 41 is connected with a memory 43 stored with programs or data, a peripheral device 44 such as a hard disc controller, a trace memory 21, a control switch 45 for generating the special bus cycle request signal SBR and so on via a system bus 42 composed of the address bus ADB, the data bus DTB, a control bus CTB and so on.

Incidentally, the CPU 41 and the control switch 45 are disposed in FIG. 4 on the side of the user system but may be disposed on the side of the emulator box 2 so that the CPU 41 may operate as a emulation microprocessor.

FIG. 16 is a table showing a portion of the data which are stored in the trace memory 21 by emulating the user system 1 using the microprocessor of the embodiment of FIG. 1 by the in-circuit emulator of FIG. 3.

In FIG. 16, the data belonging to the column indicated at AB are the data group (having the absolute address) sampled from the address bus; the data belonging to the column indicated at DB are the data group sampled from the data bus; the data belonging to the column indicated at BC are the data group sampled from the byte codes BC0 to BC3; letters R/W designate a read/write control signal; and letters BAT designates bus access type signals sampled and recorded for easy understanding.

In FIG. 16, the codes in the column DB on the row indicated at PGM in the column BAT are instruction codes, and the codes in the column DB on the row indicated at DAT are the read/write data. Moreover, the data on the row indicated at I/P in the column BAT are those sampled in the special bus cycle. In view of the BC column on that row, which of the more/less significance of the instruction codes in the column DB of the next data row that has been executed can be known.

Figure 5:
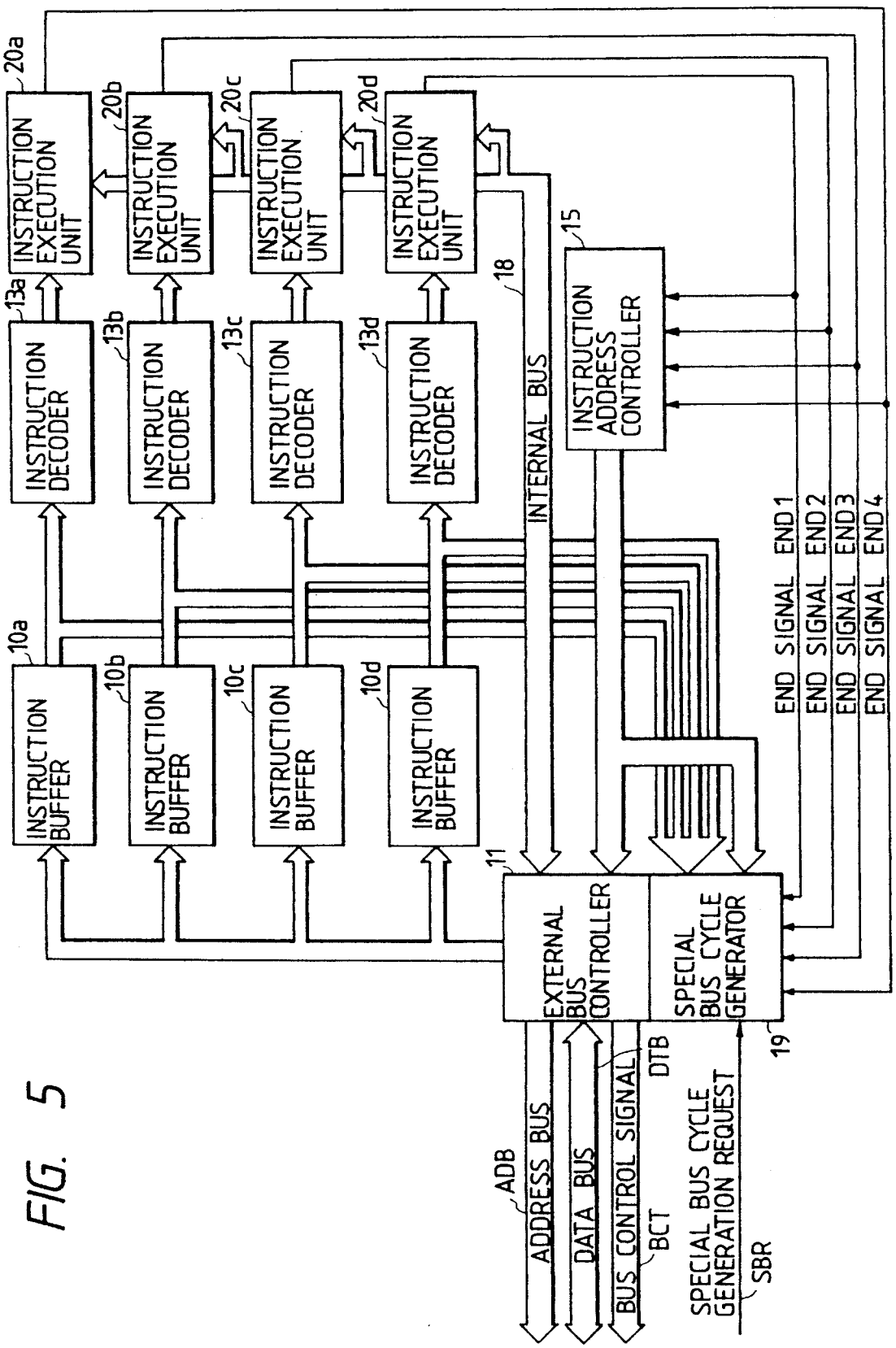
FIG. 5 is a block diagram showing a second embodiment of the microprocessor according to the present invention.

FIG. 5 shows a second embodiment of the present invention. Like elements to the embodiment of FIG. 1 are identified with like numerals.

The microprocessor of this embodiment is equipped with four sets of instruction buffers 10, instruction decoders 13 and instruction execution units 20 so that it can fetch four instructions at one time and can process them simultaneously in parallel. As a result, the processing speed of the microprocessor can be improved.

Although the four instructions can thus be processed in parallel, they are not always executed simultaneously because some instruction may need to await the result of the execution of another. As a result, an instruction to be executed may not be accessed from the outside, even if the instruction buffer 10 is only one stage.

In this embodiment, therefore, there is provided the special bus cycle generator 19 for inserting a special bus cycle to output to the external data bus the instruction to be executed next at each end of an instruction cycle in case a special bus cycle request signal SBR comes from the outside.

This special bus cycle generator 19 is fed at the end of the instruction execution with the instruction execution end signals END 1 to END 4, respectively, from four instruction execution units 20a to 20d. Moreover, the aforementioned instruction execution end signals END1 to END 4 are fed to the instruction address controller 15, too. This instruction address controller 15 is equipped with a program counter and four instruction pointers for pointing out the instruction addresses in relative values from the addresses in that program counter. When one of the instruction execution end signals END 1 to END 4 is received, only the corresponding instruction pointer is updated. Moreover, a signal indicating which instruction has been executed is outputted to the bus control signal BCT by sending the value of the pointer to the special bus cycle generator 19.

The microprocessor of this embodiment is effective especially for an instruction type of fixed length.

Figure 6:
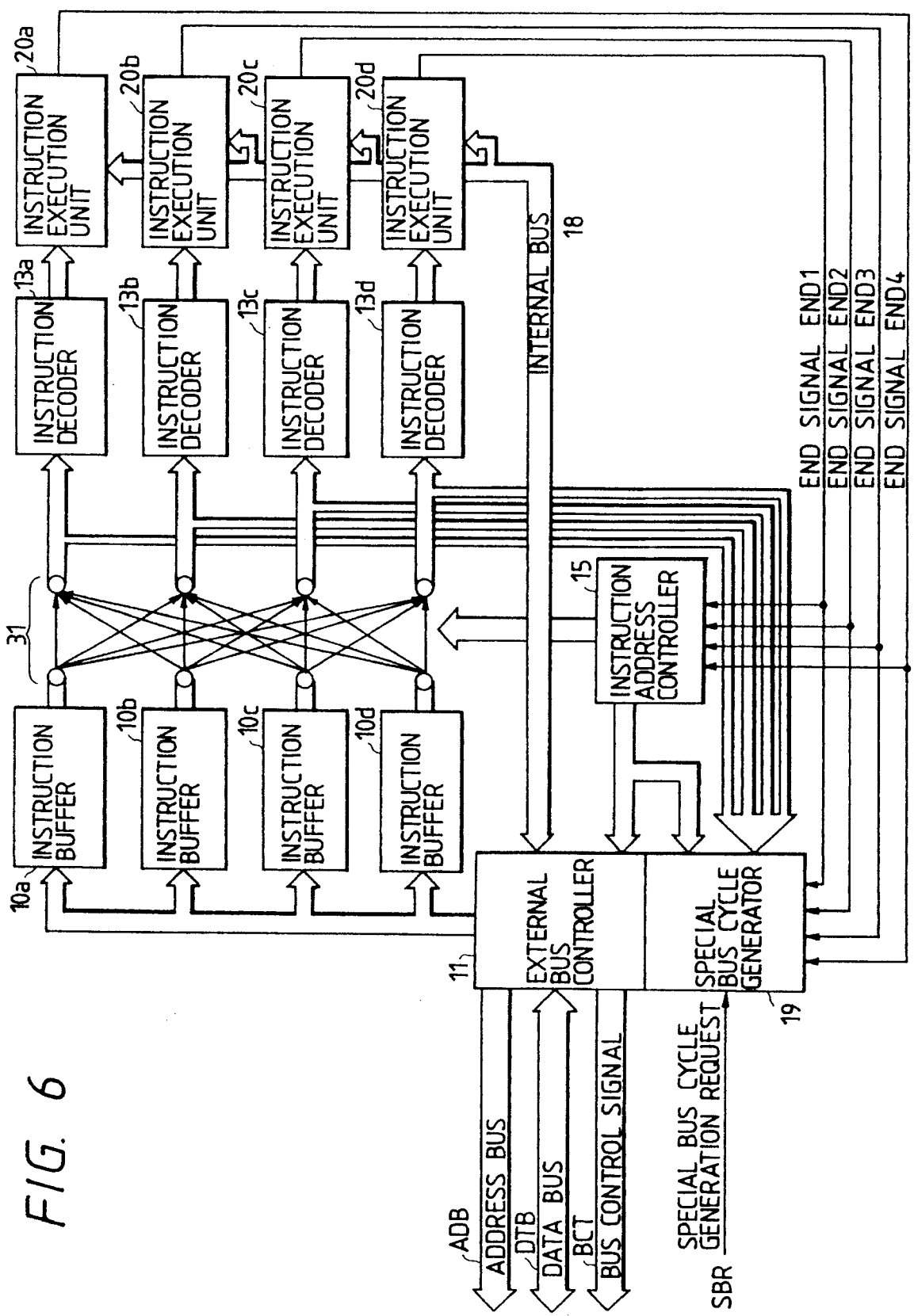
FIG. 6 is a block diagram showing a third embodiment of the microprocessor according to the present invention.

FIG. 6 shows a modification of the microprocessor of the embodiment of FIG. 5.

The microprocessor of this modification is different from the embodiment of FIG. 5 only in that a switching circuit 31 is additionally interposed between the instruction buffers 10a to 10d and the instruction decoders 13a to 13d.

In this embodiment, the instruction buffers 10a to 10d and the instruction decoders 13a to 13d are not in one-to-one relation so that the instruction codes fetched in the individual instruction buffers 10a to 10d can be fed to any of the instruction decoders. In case the four instructions fetched simultaneously are partially executed in advance, they can be efficiently processed by introducing a next instruction code into a vacant instruction decoder.

The microprocessor of this embodiment is also equipped with the special bus cycle generator 19 so that the code of the instruction to be executed next and the instruction address can be outputted to the outside.

Figure 7:
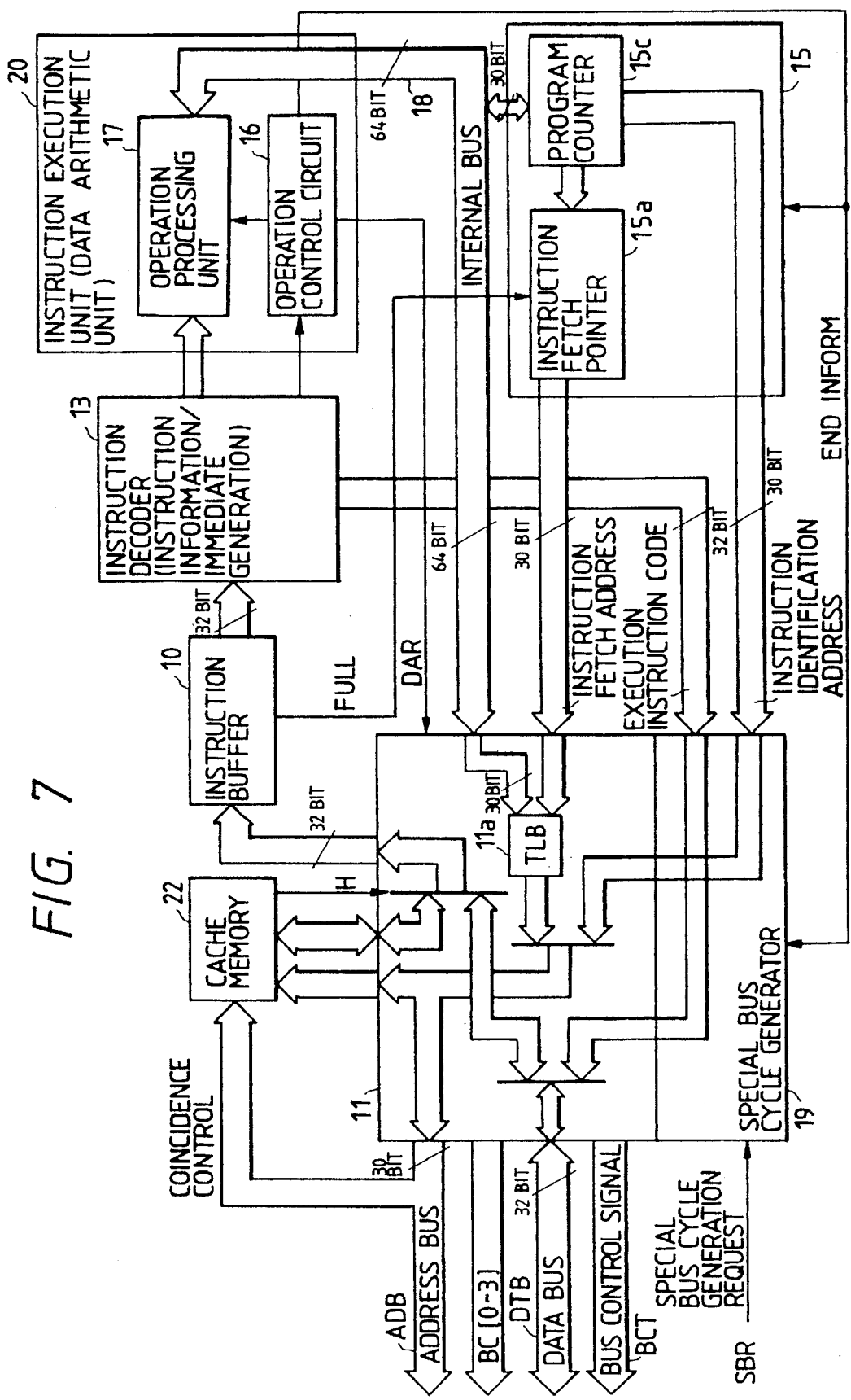
FIG. 7 is a block diagram showing a fourth embodiment of the microprocessor according to the present invention.

FIG. 7 shows an embodiment in case the present invention is applied to a microprocessor packaging a cache memory. The overall structure of the microprocessor is substantially identical to that of FIG. 1, and the difference in the hardware will be described in the following description.

In FIG. 7, reference numeral 22 designates a cache memory which is packaged in the microprocessor. The external bus controller 11 feeds the instruction code to the instruction buffer 10 and performs a data or instruction access to the outside in accordance with a data access request signal DAR of the instruction execution unit 20. At the time of fetching an instruction, the cache memory 22 is accessed first. The instruction code in the cache memory is fed to the instruction buffer 10, if hit, and the address bus ADB is accessed, if miss-hit, to fetch the instruction from the external memory.

Incidentally, the coincidence control is used for holding the consistency between the data of the external memory and the cache memory, and monitors the update of the data of the external memory and purges the corresponding data of the cache memory if their address is coincident with the data address latched in the cache memory.

The external bus controller 11 is equipped with an address conversion table (i.e., TLB: Translation Look-aside Buffers) 11*a*, although not especially limited thereto, for converting into a physical address a logical address which is fed from the instruction address controller 15 of the operation processing unit 17 via the internal bus 18.

This embodiment particularly contemplates a microprocessor of a fixed length instruction type. The instruction address controller 15 is equipped with the instruction fetch pointer 15*a* and the program counter 15*c*.

In the microprocessor of this embodiment, moreover, in the special bus cycle to be inserted by the special bus cycle generator 19, the code of the executed instruction is outputted to the data bus DTB, and the logical address in the program counter 15*c* is outputted as the instruction identification address to the address bus ADB.

Next, the operations of the aforementioned microprocessor will be described in the following text.

The external bus controller 11 converts at first the address pointed out by the instruction fetch pointer 15*a* into the physical address by the address conversion table 11*a*, sends the physical address for retrieval to the cache memory 22, reads out the instruction code from the cache memory 22, if the hit signal H is obtained, and feeds the instruction code to the instruction buffer 10. The instruction code fetched by the instruction buffer 10 is transferred to and decoded by the instruction decoder 13 to extract the kind of instruction, the recognition of the addressing mode, the generation of the immediate value, and the operation control information. In accordance with this information, the instruction execution unit 20 performs the processings such as the transfer or operation of the data.

Incidentally, the instruction decoder 13 is equipped with a buffer for latching an instruction preceding the instruction being executed, and is enabled to output the execution instruction code in the special bus cycle into the data bus DTB. This buffer may be disposed in the external bus controller 11 or the special bus cycle generator.

At each end of instruction execution, the instruction execution end signal END is outputted from the operation control circuit 16 to inform the instruction address controller 15 and the special bus cycle generator 19 of the end of the instruction execution. If the notice of the end of this instruction is received by the instruction address controller 15, the program counter 15*c* is incremented.

Incidentally, the program counter 15*c* is equipped with a buffer for latching the value before an increment and is enabled to output an instruction identification address onto the address bus ADB in the special bus cycle. This buffer may be disposed in the external bus controller 11 or the special bus cycle generator 19.

When the program is to be branched, the branch target instruction address prepared in the instruction execution unit 20 is fed via the internal bus 18 to the instruction address controller 15 and is set in the program counter 15*c* and the instruction fetch pointer 15*a*.

If, on the other hand, the retrieval of the cache memory 22 is miss-hit, the aforementioned conversion address (or physical address) is outputted to the external address bus ADB so that the instruction code is fetched from the external memory via the data bus DTB and fed to the instruction buffer 10. Simultaneously with this, the fetched instruction is sent to and stored in the cache memory 22.

The fetch of the instruction is carried out, while automatically incrementing the instruction fetch pointer 15*a*, till the instruction buffer 10 is fully occupied. When the instruction buffer 10 is fully occupied, the signal FULL is fed from the instruction buffer 10 to the instruction address controller 15 to interrupt the updating of the instruction fetch pointer 15*a*.

In the aforementioned ordinary operation mode, the internal execution instruction cannot be identified from the outside of the processor in case the instruction code is in the cache memory 22. If, in this embodiment, the special bus cycle request signal SBR is introduced from the outside, the mode is shifted to the special bus cycle insertion mode, in which the instruction code being executed inside and the address indicating the position of the instruction are outputted to the outside. In the operations of the present special mode, the instruction execution is carried out in the processor in addition to the aforementioned ordinary mode. Each time the instruction execution end signal END is outputted, the special bus cycle generator 19 controls the external bus controller 11 to feed, in parallel with the internal instruction execution, the instruction identification address of the instruction preceding the instruction being executed and the execution instruction code to the vacant address bus ADB and data bus DTB, respectively, and to output the signal for identifying the bus access type or the data type as a code for indicating the special bus cycle to the bus control signal BCT.

As a result, the execution instruction word in the processor and the address can be identified by observation outside of the processor. At this time, however, there may be a conflict with the intrinsic instruction word fetch and the data access due to the cache miss-hit. In case, however, the requests of the plural bus cycles conflict, the external bus controller 11 generates an external bus cycle in accordance with a predetermined priority. Specifically, in the special bus cycle insertion mode, the special bus cycle is generated prior to the bus cycle due to the cache miss-hit.

In case of the cache miss-hit, the special bus cycle may or may not be inserted next to the instruction fetch cycle at the time when the processor fetches the instruction from the external memory. The purpose of monitoring the external bus is to identify such instruction fetch cycle. If, however, the special bus cycle indicating it to the outside is not inserted next to the instruction fetch cycle at the miss-hit time, there can be attained an advantage that the speed can be accordingly accelerated for the absence of the special bus cycle, although the hardware itself is more or less complicated.

Figure 14:
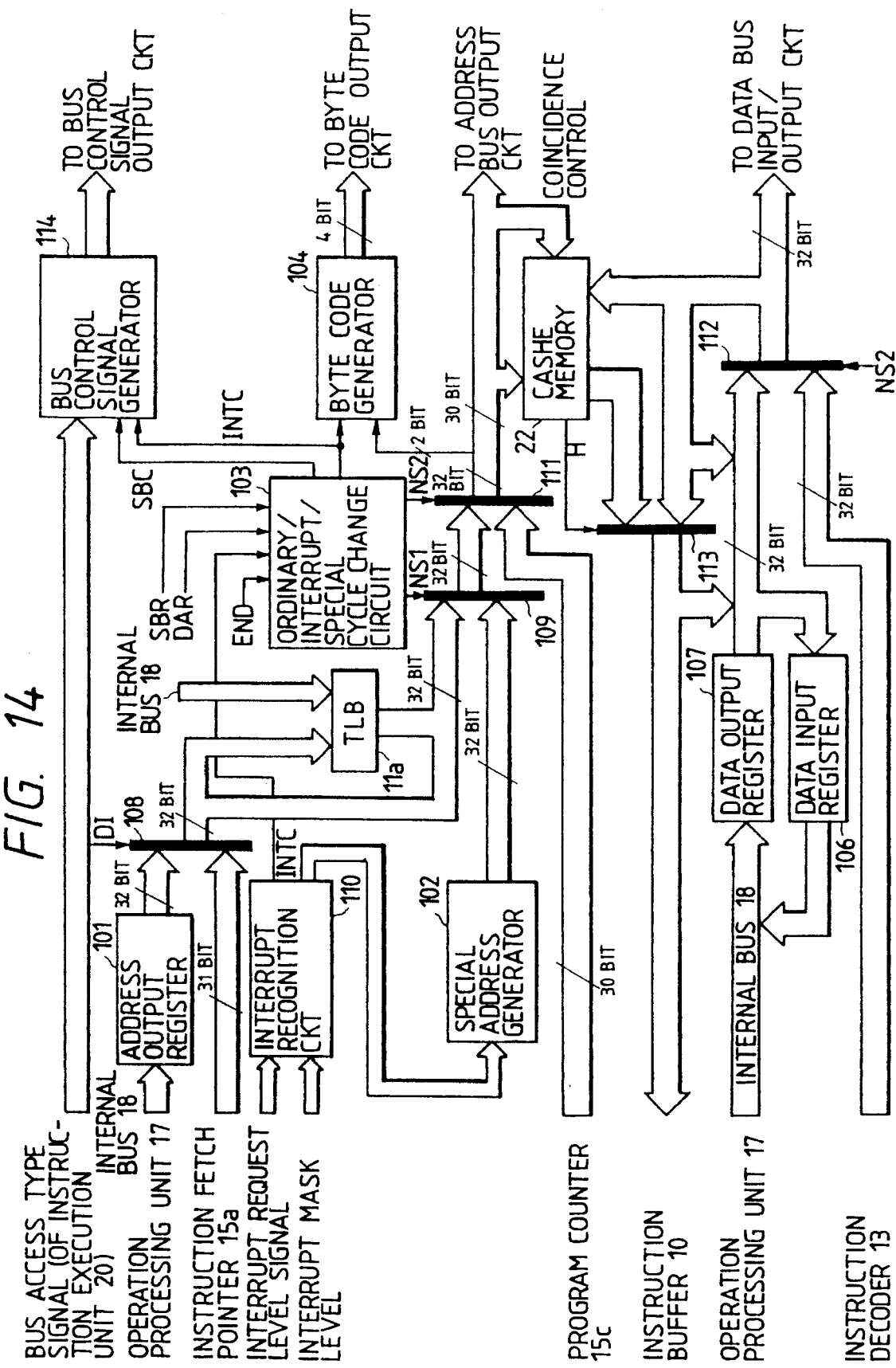
FIG. 14 is a block diagram showing the external bus controller 11 and the special bus cycle generator 19 of the microprocessor as shown in FIG. 7.

FIG. 14 shows one example of the external bus controller 11 and the special bus cycle generator 19 of the microprocessor of FIG. 7. Like elements to the elements of FIG. 9 are identified by like numerals.

In FIG. 14, the reference numeral 101 designates an address output register; numeral 102, a special address generator; numeral 103, an ordinary/ interrupt/special cycle change circuit; numeral 104, a byte code generator; numeral 105, a bus access type generator; numeral 106, a data input register; numeral 107, a data output register; numerals 108, 109, 111, 112 and 113, selectors; and, numeral 110, an interrupt recognition circuit. The structures of the external bus controller 11 and the special bus cycle generator 19 are substantially identical to those of FIG. 9. The differences in the hardware will be described in the following.

The special address generator 102 generates a special address to be outputted to the address bus ADB in the interrupt cycle, unlike FIG. 9, in accordance with the interrupt request level of the output of the interrupt recognition circuit 110.

In response to the interrupt allowance signal INT, the data access request signal DAR, the special bus cycle generation request signal SBR and the instruction execution end signal END, the ordinary/interrupt/special cycle changer 103 sends a signal NS1 for selecting one of the output of the selector 108, the output of the TLB 11a and the output of the special address generator 102 by means of the selector 109, and a signal NS2 for selecting one of the output of the selector 109 and the output of the program counter 15c for feeding the instruction identification address by means of the selector 111 and for selecting one of the output of the data output register 107 and the output of the instruction decoder 13 by means of the selector 112. The change circuit also sends a signal INTC indicating the interrupt cycle, and a signal SBC indicating the special bus cycle. The selectors 111 and 112 have a function to arrange the bit length like the selector 109 of FIG. 9.

The byte code generator 104 feeds the byte code output circuit with byte code data necessary for the individual cycles in response to the less significant 2 bits of the address of 32 bits, a signal DW indicating the width of the data outputted from the instruction execution unit 20 and to be accessed, and a signal INTC indicating the interrupt cycle.

In response to the hit signal H coming from the cache memory 22, the selector 113 selects one of the instructions in the cache memory 22 and the instruction fetched from the external memory and feeds it to the instruction buffer 10 or the data input register 106. The bus control signal generator 114 feeds the bus control signal output circuit with identification signal data such as the bus access type data and the data type in response to the signal INTC indicating the interrupt cycle, the signal SBC indicating the special bus cycle, and the bus access type signal outputted from the instruction execution unit 20.

The address output register 101 is interposed between the internal bus 18 and the selector 108 in this embodiment but may be interposed between the selector 108 and the TLB 11a, between the TLB 11a and the selector 109, between the selector 109 and the selector 111, or between the selector 111 and the address bus output circuit.

FIG. 15 shows one example of the state transitions of the bus cycles to be controlled by the external bus control circuit 11 and the special bus cycle generator 19 of the microprocessor of FIG. 7.

The state Ti is entered in response to the signal RESET for initializing the microprocessor not shown in FIG. 7. In the state Ti, the bus cycle is idle, and this state is transitioned to the ordinary bus cycle (i.e., the states T0 and T1), the special bus cycle (i.e., the states T0S and T1S) and the interrupt state T2 selectively by a combination of the data access request signal DAR, the hit signal H, the special bus cycle request signal SBR, the instruction execution end signal END and the interrupt grant signal INT. The transitions from the state T0 to the state T1 and from the state T0S to the state T1S are unconditional.

This embodiment is different from the embodiment of FIG. 10 in that the interrupt cycle is not one of the special bus cycles (i.e., the states T0S and T1S) but one of the ordinary bus cycles (i.e., the states T0 and T1), although not especially limited thereto. In this embodiment, moreover, the special bus cycle request signal SBR is preferred, in case the interrupt grant signal INT and the special bus cycle request signal SBR are simultaneously generated. Moreover, the special bus cycle is established preferentially of the bus cycle due to the cache miss-hit. Still moreover, the ordinary bus cycle and the special bus cycle are automatically ended in this embodiment with no external condition. For example, however, the bus cycle may be ended in response to an acknowledge signal or the like coming from the external memory. In this case, the state T1 to T1S is continued till the acknowledge signal is inputted.

Figure 8:
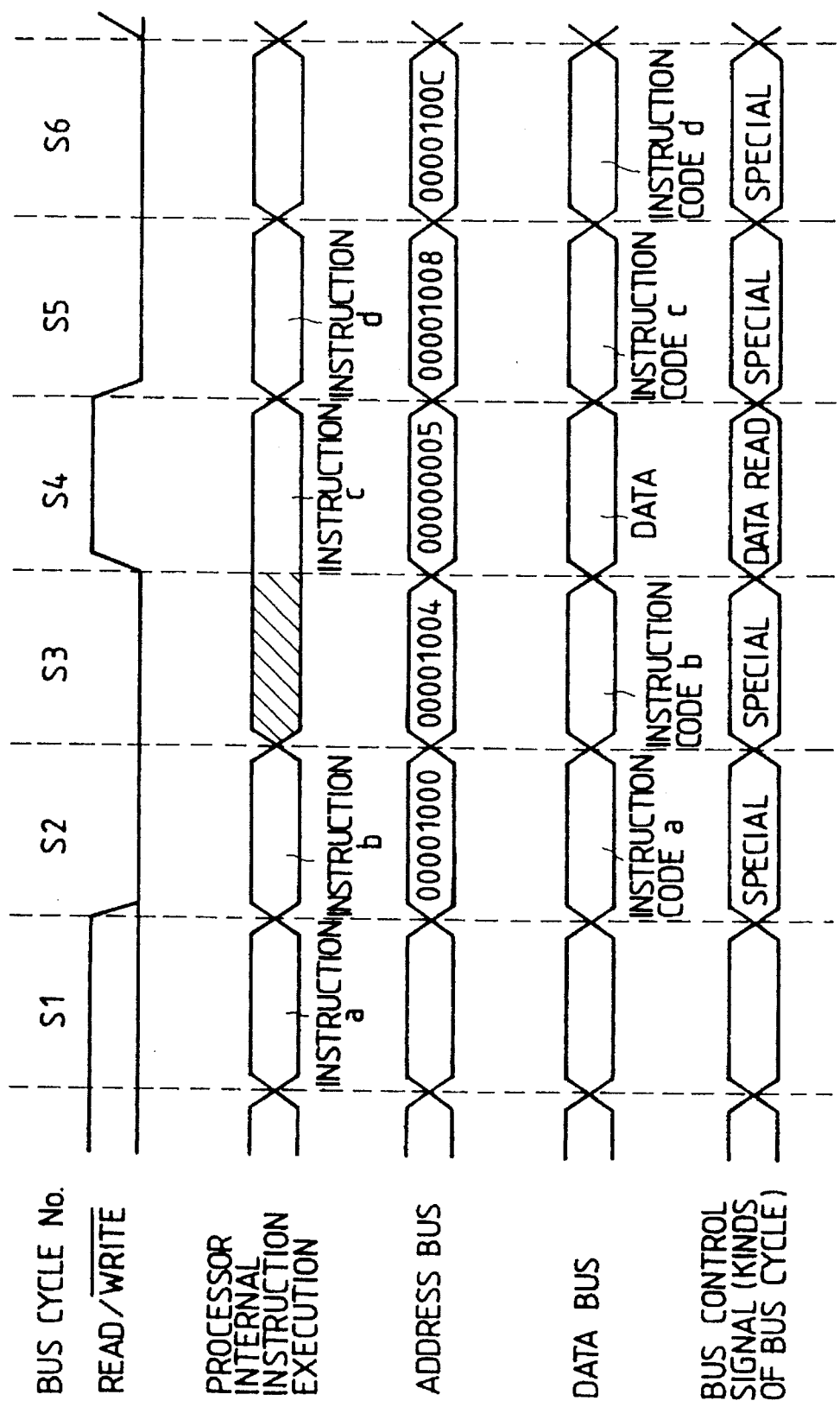
FIG. 8 is a timing chart showing the operations in the special bus cycle insertion mode of the microprocesor as shown in FIG. 7.

FIG. 8 shows the operation timings of the individual buses in case the following program is executed in the system using the aforementioned microprocessor:

| | | | |
|---|---|---|---|
| 00001000 | | MOVE #4, R0.w | a |
| 00001004 | LABEL1 : | ADD #1, R0.w | b |
| 00001008 | | MOV @R0.h, R1.W | c |
| 0000100C | | MOV R1.w, R2.w | d |

Incidentally, the operation of timings of FIG. 8 correspond to the case in which the instructions a to d are already stored in the cache memory 22.

With reference to FIG. 8, the instruction a is executed in the processor in the bus cycle S1. In the bus cycle S2, in parallel with the instruction b being executed in the processor; the instruction code a executed in the cycle S1 is outputted to the external data bus; the instruction address is outputted to the external address bus; and the code indicating the special bus cycle is outputted to the bus control signal BCT.

Since the next instruction c (MOV @R0.h, R1.W) is accompanied by the data access, it is also found from FIG. 8 that the execution of the instruction c is interrupted in the processor, that the special bus cycle is preferentially executed in the bus cycle S3, and that the instruction code of the instruction b executed in the preceding cycle and the address are outputted. Moreover, the execution of the instruction c is done in the cycle S4 next to the special bus cycle S3, so that the address indicating the position of the desired data are on the address bus, whereas the read data are on the data bus. The code and address of the instruction c executed in the bus cycle S4 are outputted to the outside in the next bus cycle S5. At this time, the instruction d is executed in parallel in the processor so that the code and address of the instruction d are outputted to the outside in the next bus cycle S6.

Incidentally, in the microprocessor of the embodiment of FIG. 7, the address of the executed instruction in the special bus cycle is outputted as the logical address. However, the instruction identification address fed from the program counter 15c to the special bus cycle generator 19 may be outputted as the physical address by way of the address conversion table 11a.

Moreover, the embodiment of FIG. 7 exemplifies a microprocessor for handling an instruction of fixed length. Like the embodiment of FIG. 1, however, an instruction of variable length can be handled by providing two sets of instruction buffers and by adding the instruction code pointer 15b to the inside of the instruction address controller 15. The present invention can also be applied to the microprocessor having a cache memory packaged therein.

In the embodiment thus far described, the microprocessor having a buffer or memory capable of holding a plurality of instructions in advance is given a function to insert a special bus cycle for outputting internal information of the processor in a predetermined operation mode to the outside at each instruction execution. As a result, in the emulation of the system using the microprocessor of an instruction prefetch type, it is possible to know which instruction has been executed, easily from the outside. There can be attained an effect that an accurate emulation control can be carried out while facilitating the analysis of the trace data to improve the debugging efficiency.

Since the intrinsically useless special bus cycle is inserted, a complete real time property cannot be attained. Despite this fact, however, the real time property is hardly deteriorated, as compared with the systems of the prior art in which predetermined instruction series are executed by the interruption function or the like to inform the outside of the internal information, because what is inserted is only one cycle.

Still moreover, the information necessary for the emulation is outputted in the time division manner with the ordinary cycle, the microprocessor used in the user system and the microprocessor for the emulation can be realized by one microprocessor. Furthermore, the load of the LSI development can be lightened because the hardware for inserting the special bus cycle is only a little increased.

Although our invention has been specifically described in connection with its embodiments, it should not be limited thereto but can naturally be modified in various manners without departing from the gist thereof. In the foregoing embodiments, for example, the special bus cycle insertion mode is carried out on the basis of the special bus cycle request signal coming from the external pin, but the special bus cycle generator 19 may be equipped with a flag or register for effecting a shift to the special bus cycle insertion mode by writing the flag or register.

Moreover, the special bus cycle is only described as one in the foregoing embodiments but may be inserted in plurality. In the foregoing embodiments, furthermore, the information indicating either the instruction to be executed or the instruction having been executed immediately before is outputted in the special bus cycle. Despite this fact, the information necessary for the debugging such as the content of the register for latching the arithmetic result may be outputted in the special bus cycle. Furthermore, not only the information observable to the user of the microprocessor such as the content of the register for latching the arithmetic or logical operation result but also the internal information of the microprocessor unobservable to the user of a temporary register necessary for debugging or testing the LSI may be outputted in the special bus cycle.

The description thus far made is directed to the case, in which our invention is applied to the microprocessor providing the background field of its application. However, the present invention should not be limited thereto but can be generally applied to a single-chip microcomputer or another data processor of program control type.

As can be seen from the above description, the internal information such as the address of an instruction being executed can be informed to the outside in the microprocessor of instruction prefetch type with neither increasing the pin number nor any complicated external circuit.

Moreover, it is possible to realize a microprocessor which can inform the outside of the internal information without deteriorating the real time property and which is highly flexible for the increase in the amount of information necessary.

By using the present microprocessor, it is possible, without preparing any special microprocessor for the emulation, to provide an in-circuit emulator for emulating the user system using the microcomputer which is equipped with an instruction register or cache for fetching a plurality of instructions in advance.

What is claimed is:

1. An in-circuit emulator system having a trace memory for storing a signal on a bus for debugging a program, a break point control unit for stopping a trace to interrupt the program and a microprocessor for prefetching a plurality of instructions, said emulation microprocessor comprising:

an instruction buffer for holding a plurality of instructions fetched from an external memory;

an instruction decoder, coupled to said instruction buffer, for decoding said instructions, and for providing a decoded result;

an instruction execution unit coupled to said instruction decoder, including an operation device and registers, and for executing said instructions;

an address controller, coupled to said instruction execution unit, and including an instruction fetch pointer for identifying an address;

a bus control circuit, coupled to said instruction buffer, to said instruction execution unit and to said address controller, having a bus cycle change circuit, said bus cycle change circuit having a function for inserting a bus cycle in said plurality of instructions after completion of a first instruction execution and before a next instruction execution for outputting internal information of said microprocessor when a special bus cycle request signal from said break point control unit and an internal control signal of a predetermined level are provided to said cycle change circuit and while continuing a sequence of said plurality of instructions so that the outputting of the internal information for program debugging is done without deteriorating real time behavior of the microprocessor;

wherein said instruction buffer, said instruction decoder, said instruction execution unit, said address controller, and said bus control circuit, all are constructed in a single semiconductor device.

2. The microprocessor according to claim 1, wherein the internal control signal is an interrupt signal.

3. A microprocessor for executing a plurality of instructions in parallel comprising:

a plurality of instruction buffers for holding a plurality of instructions fetched from an external memory;

an instruction decoder, coupled to said instruction buffers, for decoding said instructions, and for providing a decoded result;

a plurality of instruction execution units, coupled to said instruction decoder, including an operation device and registers, for executing said instructions in accordance with said decoded result, respectively, so that said instruction execution units can execute said instructions in parallel;

an address controller, coupled to said instruction execution unit, including an instruction fetch pointer for identifying an address;

a bus control circuit, coupled to said instruction buffers, to said instruction execution units and to said address controller comprising a bus cycle change circuit, said bus cycle change circuit having a function for inserting a bus cycle between distinct instruction executions in said plurality of instructions for outputting internal information of said microprocessor when a special bus cycle request signal is provided to said cycle change circuit for program debugging without deteriorating real time behavior in the microprocessor; and wherein said instruction buffers, said instruction decoder, said instruction execution units, said address controller, and said bus control circuit, all are constructed in a single semiconductor device.

4. The microprocessor according to claim 3, wherein the bus control circuit comprises a circuit for inserting the bus cycle for outputting the internal information indicating an executing instruction.

5. The microprocessor according to claim 4, wherein the circuit includes control means for operating in accordance with an end signal for indicating an end of the executing instruction and the special bus cycle request signal.

6. The microprocessor according to claim 3, wherein the special bus cycle request signal is selectively provided by an external source or an internal source in the microprocessor.

* * * * *